(12) United States Patent
Park

(10) Patent No.: US 10,209,795 B2
(45) Date of Patent: Feb. 19, 2019

(54) METHOD FOR TRANSMITTING DATA

(71) Applicant: 2GATHER INC., Seoul (KR)

(72) Inventor: Sang Jun Park, Seoul (KR)

(73) Assignee: 2GATHER INC., Seoul (KR)

( * ) Notice: Subject to any disclaimer, the term of this patent is extended or adjusted under 35 U.S.C. 154(b) by 27 days.

(21) Appl. No.: 15/317,352

(22) PCT Filed: Jul. 29, 2015

(86) PCT No.: PCT/KR2015/007903
§ 371 (c)(1),
(2) Date: Dec. 8, 2016

(87) PCT Pub. No.: WO2016/104905
PCT Pub. Date: Jun. 30, 2016

(65) Prior Publication Data
US 2017/0139494 A1   May 18, 2017

(30) Foreign Application Priority Data

Dec. 23, 2014   (KR) .................. 10-2014-0187441

(51) Int. Cl.
| | |
|---|---|
| G06F 3/041 | (2006.01) |
| G06F 21/35 | (2013.01) |
| H04W 4/80 | (2018.01) |
| H04W 12/08 | (2009.01) |
| G06F 3/039 | (2013.01) |

(52) U.S. Cl.
CPC .............. *G06F 3/041* (2013.01); *G06F 3/039* (2013.01); *G06F 3/0416* (2013.01); *G06F 21/35* (2013.01); *H04W 4/80* (2018.02); *H04W 12/08* (2013.01); *G06F 2203/04104* (2013.01)

(58) Field of Classification Search
CPC ....... H04W 12/06; H04W 4/023; H04W 4/50; H04W 36/04; H04W 48/14; H04W 76/12; H04W 12/08; H04W 4/14
USPC .......... 455/411, 432.1, 456.3, 466, 410, 418, 455/419, 41.1, 426.1
See application file for complete search history.

(56) References Cited

U.S. PATENT DOCUMENTS

| | | | |
|---|---|---|---|
| 2010/0139992 A1* | 6/2010 | Delia ...................... | G06F 21/32 178/19.01 |
| 2014/0267147 A1* | 9/2014 | Buelow .................. | G06F 3/044 345/174 |
| 2014/0362007 A1* | 12/2014 | Jung ................... | G06F 3/04883 345/173 |

FOREIGN PATENT DOCUMENTS

| | | |
|---|---|---|
| JP | 2003316871 A | 11/2003 |
| JP | 2012256246 A | 12/2012 |
| KR | 10-2012-0030308 A | 3/2012 |
| KR | 10-2013-0065789 A | 6/2013 |
| KR | 10-1305413 B1 | 9/2013 |
| KR | 10-2013-0117576 A | 10/2013 |
| KR | 10-2014-0102168 A | 8/2014 |

(Continued)

*Primary Examiner* — Fred Casca
(74) *Attorney, Agent, or Firm* — Snyder, Clark, Lesch & Chung, LLP

(57) ABSTRACT

A data transmission method may include receiving identification (ID) information from a data transmission device. The method may also include receiving encoded security information from the data transmission device. The method may include verifying validity of the ID information by decoding the encoded security information. The encoding and decoding of the security information may be performed using a one-time password (OTP) code.

12 Claims, 9 Drawing Sheets

(56) References Cited

FOREIGN PATENT DOCUMENTS

KR 10-2014-0144766 A 12/2014
KR 10-1466964 B1 12/2014

\* cited by examiner

[Fig. 1]
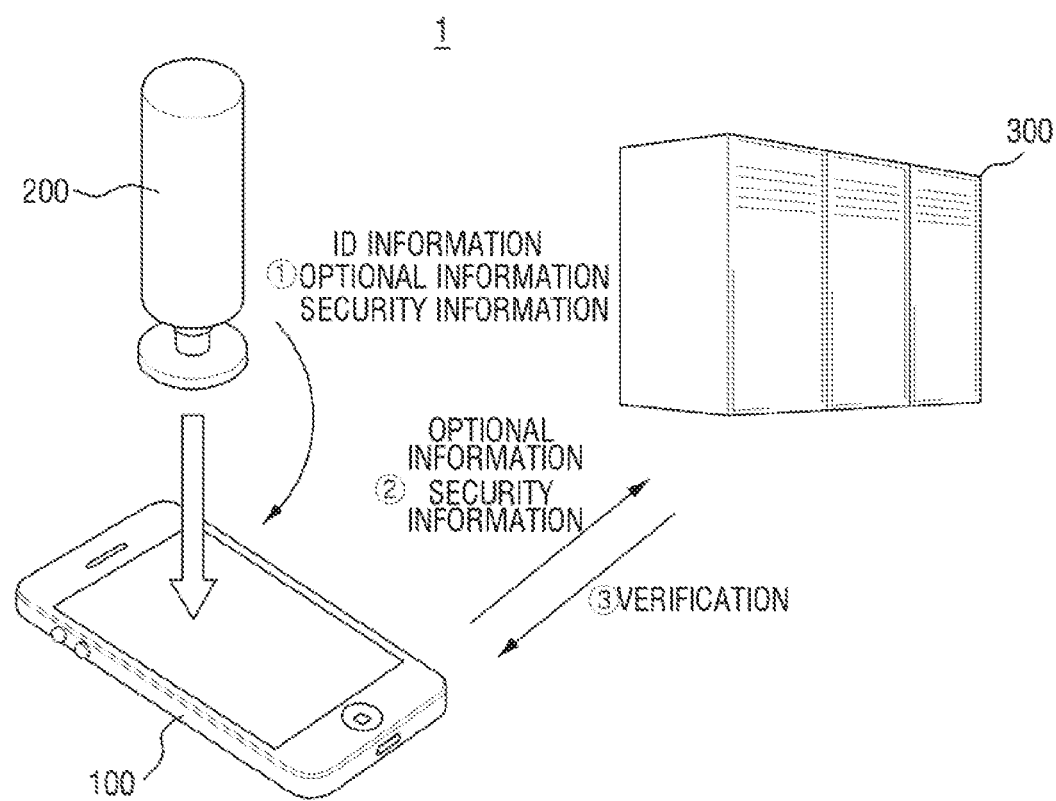

[Fig. 2]
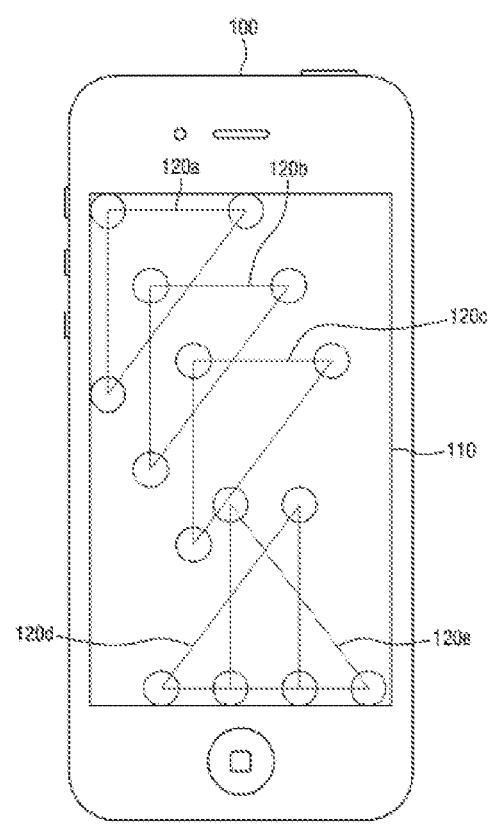

[Fig. 3]
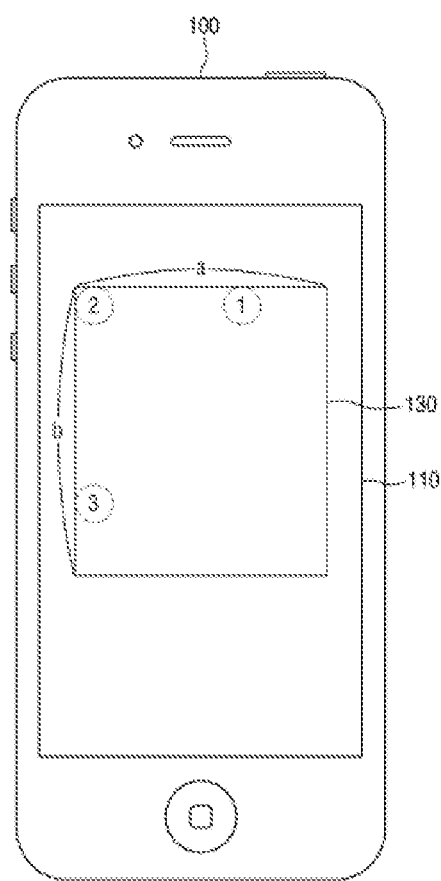

[Fig. 4]
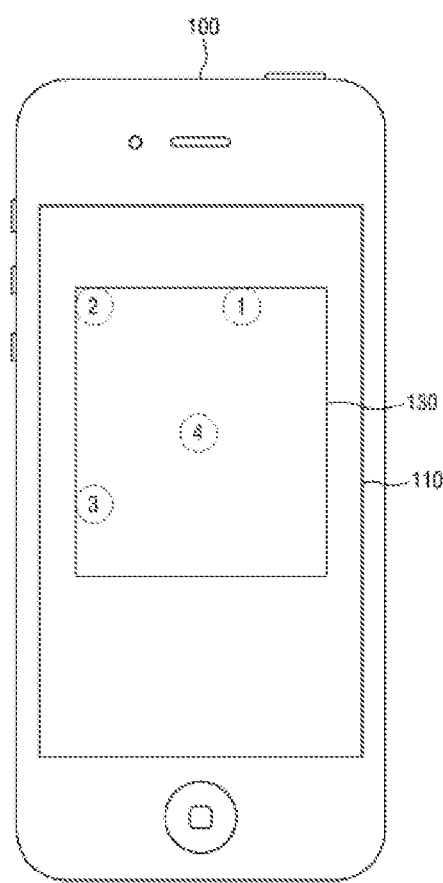

[Fig. 5]
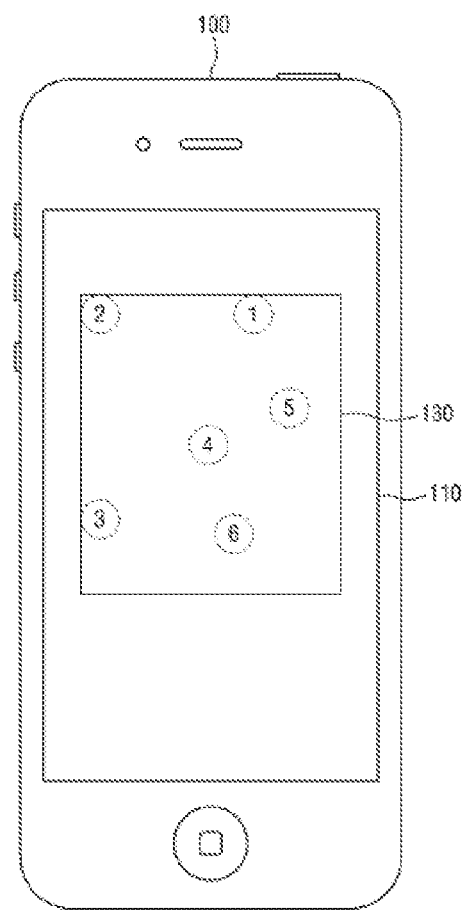

[Fig. 6]
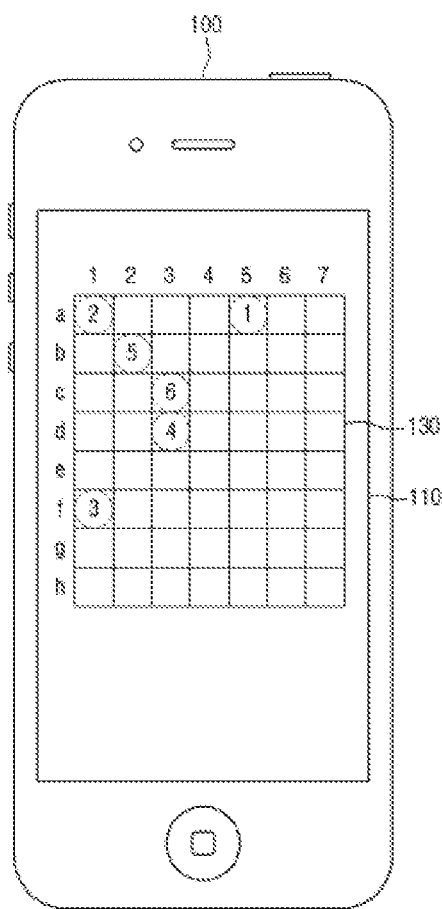

[Fig. 7]
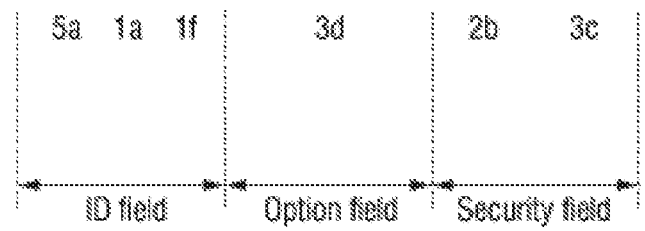
[Fig. 8]
| TIME (YEAR/MONTH/DAY/HOUR/ MINUTE/SECOND) | OTP |
|---|---|
| 20130213000100 | 2b 3c |
| 20130213000130 | 2b 3d |
| 20130213000200 | 2b 3e |
| 20130213000230 | 2b 3f |
| 20130213000300 | 2b 3g |

[Fig. 9]
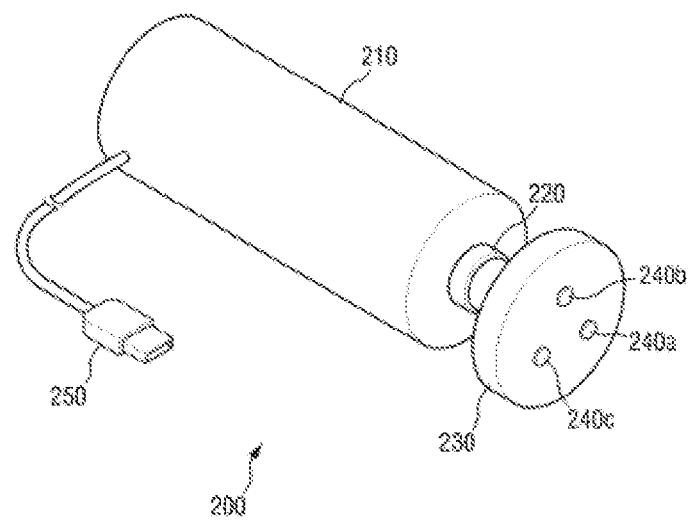
[Fig. 10]
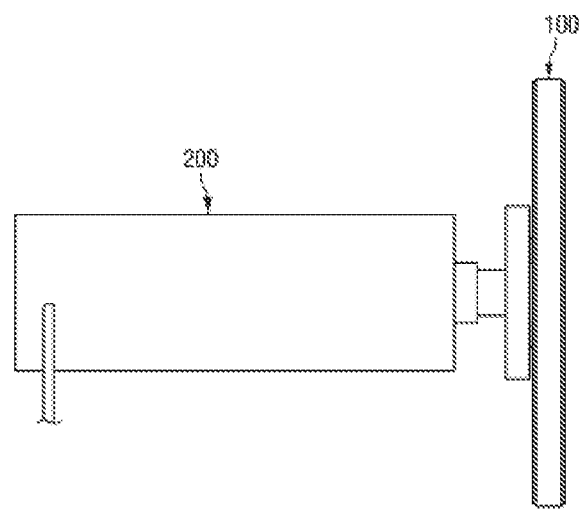

[Fig. 11]
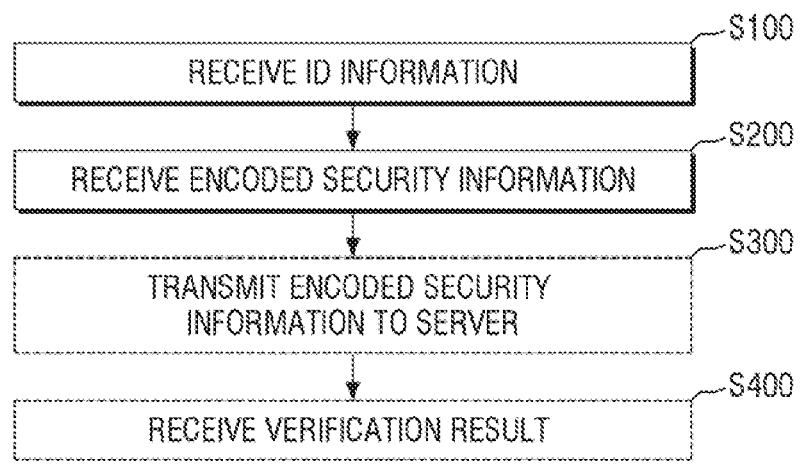

METHOD FOR TRANSMITTING DATA

CROSS-REFERENCE TO RELATED APPLICATIONS

This application is a national-stage application of and claims the benefit of International Application No. PCT/KR2015/007903 filed Jul. 29, 2015, which is incorporated by reference herein, which claims priority to Korean Application No. 10-2014-0187441 filed Dec. 23, 2014.

TECHNICAL FIELD

The present inventive concept relates to a data transmission method.

BACKGROUND ART

A touchscreen embedded in an electronic device such as a smartphone receives a touch input. The touchscreen may exist in various forms. For example, a capacitive touchscreen uses static electricity or a particular electric current flowing in a human body, and a resistive touchscreen uses pressure. Other types of touchscreens such as an electromagnetic induction touchscreen, an ultrasonic touchscreen and an infrared touchscreen are also being used.

A capacitive touchscreen has a function called multi-touch. When multiple points on the touchscreen are touched simultaneously, multi-touch enables the touchscreen to recognize the points simultaneously. If multi-touch is used, various patterns formed using multi-touched points can be input to an electronic device such as a smartphone. Of the various patterns, only different types of patterns that are distinguished from each other can be used as identification marks.

CITATION LIST

Patent Literature

Korean Patent Publication No. 10-2012-0030308

DISCLOSURE

Technical Problem

Aspects of the inventive concept provide a data transmission method employed to provide highly reliable information about whether a wireless communication device has visited a place.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

Technical Solution

According to an aspect of the inventive concept, there is provided a data transmission method including: (a) receiving ID information of a data transmission device from the data transmission device by using a wireless communication device; and (b) receiving encoded security information from the data transmission device by using the wireless communication device.

The wireless communication device may include a touchscreen, and the operation (a) may include receiving a first identification pattern related to the ID information when the data transmission device touches a first identification pattern point on the touchscreen of the wireless communication device.

The first identification pattern point may include a region forming point for defining a touch region.

The first identification pattern point may be provided in a plurality, wherein the first identification pattern points are touched sequentially or simultaneously.

The method may further include (c) receiving optional information from the data transmission device by using the wireless communication device, wherein the optional information includes at least one of the number of visits, order contents, order amount, the type of a visit verification shape, and the number of visit verification shapes.

At least one of the ID information, the optical information and the security information may be transmitted from the data transmission device using short-range wireless communication.

The operation (b) may include receiving a second identification pattern related to the security information when the data transmission device touches a second identification pattern point on the touchscreen, and the operation (c) may include receiving a third identification pattern related to each of the ID information, the optional information and the security information when the data transmission device touches a third identification pattern point on the touchscreen.

The first through third identification patterns may be transmitted at a time when the first through third identification pattern points are touched successively.

The wireless communication device may include a position sensor, and the operation (a) may include obtaining position information using the position sensor and identifying the data transmission device using the position information and the ID information.

The method may include (d) verifying validity of the ID information by decoding the encoded security information using the wireless communication device.

The operation (d) may include: transmitting the encoded security information to a server by using the wireless communication device; and verifying validity of the ID information by decoding the security information using the server.

The encoding and decoding of the security information may be performed using one-time password (OTP) code.

Advantageous Effects

The inventive concept can more easily and rapidly identify information indicating that a wireless communication device has visited an area adjacent to a specific data transmission device and verify validity of the information through security verification.

In addition, the inventive concept can determine validity of the information not only in an online environment but also in an offline environment.

However, the effects of the inventive concept are not restricted to the one set forth herein. The above and other effects of the inventive concept will become more apparent to one of daily skill in the art to which the inventive concept pertains by referencing the claims.

DESCRIPTION OF DRAWINGS

These and/or other aspects will become apparent and more readily appreciated from the following description of the embodiments, taken in conjunction with the accompanying drawings in which:

FIG. 1 illustrates a system employing a data transmission method according to an embodiment of the inventive concept;

FIGS. 2 and 3 illustrate touch region forming points in a wireless communication device in a data transmission method according to an embodiment of the inventive concept;

FIGS. 4 through 6 illustrate operations in a method of forming an identification pattern in the wireless communication device in the data transmission method according to the embodiment of the inventive concept;

FIG. 7 illustrates the configuration of an identification pattern in the wireless communication device in the data transmission method according to the embodiment of the inventive concept;

FIG. 8 illustrates a table showing a security field of the identification pattern in the wireless communication device in the data transmission method according to the embodiment of the inventive concept;

FIG. 9 is a perspective view of a data transmission device in a data transmission method according to an embodiment of the inventive concept;

FIG. 10 is a side view illustrating a physical contact between the data transmission device and a wireless communication device in the data transmission method according to the embodiment of the inventive concept; and FIG. 11 is a flowchart illustrating a data transmission method according to an embodiment of the inventive concept.

MODE FOR INVENTION

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the inventive concept.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

Spatially relative terms, such as "below," "beneath," "lower," "above," "upper" and the like, may be used herein for ease of description to describe the relationship of one element or component to another element(s) or component (s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations and/or elements, but do not preclude the presence or addition of one or more other components, steps, operations, elements and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a system employing a data transmission method according to an embodiment of the inventive concept will be described with reference to FIG. 1.

FIG. 1 illustrates a system employing a data transmission method according to an embodiment of the inventive concept.

Referring to FIG. 1, a data transmission system according to an embodiment of the inventive concept includes a wireless communication device 100, a data transmission device 200, and a sever 300. Here, the server 300 is not an essential element and can be omitted.

The wireless communication device 100 may be a device capable of performing wireless communication. The wireless communication device 100 may include, but not limited to, a point-of-sale (POS) terminal, a smartphone, a smart pad or a computer having a global positioning system (GPS) sensor for sensing position, acceleration, motion, etc., a gyro sensor, a speed sensor, a motion recognition sensor, etc.

All forms of computer programs that can be connected to the server 300 may be installed in the wireless communication device 100. If the electronic device is a smartphone or a smart pad, applications may be installed.

The wireless communication device 100 may include a sensor which can sense a physical contact. The term "physical contact" does not necessarily mean touching an object. That is, even when a surface of the wireless communication device 100 does not touch a surface of an object, it can be defined that a physical contact has occurred if there is an interaction between the wireless communication device 100 and the object. Therefore, a contactless sensing operation such as barcode recognition or QR code recognition is also defined as a physical contact. That is, an electrical or optical interaction between two objects separated by a certain distance is also defined as a physical contact.

The sensor may include a sensor which can sense ultrasonic waves or sound waves. That is, when the data transmission device 200 generates an ultrasonic signal or a sound wave signal, the wireless communication device 100 may sense the ultrasonic signal or the sound wave signal. However, the inventive concept is not limited to this case. That is, the data transmission device 200 can also include a sensor which can sense sound waves or ultrasonic waves. In this case, when the wireless communication device 100 generates an ultrasonic signal or a sound wave signal, the data transmission device 200 may sense the ultrasonic signal or the sound wave signal.

The wireless communication device 100 may include a touchscreen. The touchscreen may display contents of the wireless communication device 100. The wireless communication device 100 may display data received from the server 300 on the screen.

The wireless communication device 100 may also sense the data transmission device 200 through, but not limited to, short-range wireless communication. The short-range wireless communication may be any one or a combination of, e.g., Bluetooth, near field communication (NFC), radio frequency (RF) communication, zigbee communication, ultrasonic communication and sound wave communication.

The data transmission device 200 may also sense the wireless communication device 100. That is, a host and a guest of short-range wireless communication are not limited to particular devices. However, the configuration of the data transmission device 200 can be simplified in a case where the wireless communication device 100 is a host and the data transmission device 200 is a guest.

Therefore, if the data transmission device 200 is a guest, the wireless communication device 100 may visit an area adjacent to the data transmission device 200 and sense the data transmission device 200.

If the wireless communication device 100 and the data communication device 200 perform wireless communication using ultrasonic waves or sound waves, they may communicate with each other by recognizing a difference in frequency as information. However, the inventive concept is not limited to this case.

The wireless communication device 100 may receive ID information of the data transmission device 200 from the data transmission device 200. The operation of receiving the ID information of the data transmission device 200 in advance may be performed by a program or application installed in the wireless communication device 100. The program or application may be installed in the wireless communication device 100. The program or application may include a web through a wireless network. The data transmission device 200 may be installed in a plurality at a plurality of predetermined locations. The ID information may be used to identify the data transmission device 200. Therefore, once the ID information is obtained, it is possible to immediately identify which data transmission device 200 installed at which location is performing data transmission with the wireless communication device 100.

The wireless communication device 100 may receive optional information, from the data transmission device 200. The optional information may be information irrelevant to the ID information. That is, the optional information may include at least one of the number of visits, order contents, order amount, the type of a visit verification shape, and the number of visit verification shapes.

Specifically, the optional information can be any information as long as it is irrelevant to the ID information. For example, when the wireless communication device 100 visits a store in which the data transmission device 200 is located, information such as points or reservation confirmation can be included in the optional information. Alternatively, when the wireless communication device 100 visits a tourist spot where the data transmission device 200 is located, information about a visit history such as in a stamp tour can be included in the optional information. In addition, in another example, if a participant in an offline event brings the wireless communication device 100 to an event location where the data transmission device 200 is located, information for the event may be transmitted to the wireless communication device 100 as the optional information.

That is, when the wireless communication device 100 is coupled to the data transmission device 200, the data transmission device 200 can identify that the wireless communication device 100 is visiting an area adjacent to the data transmission device 200 and transmit information (the number of visits) about what number visit this is to the wireless communication device 100. In addition, if the data transmission device 200 is installed in a place such as a store which provides goods or services, order contents and order amounts of the goods or services may be included in the optional information. Furthermore, information (the type and number of visit verification shapes) about how visit verification will be expressed may be included in the optional information.

The wireless communication device 100 may receive encoded security information from the data transmission device 200. The encoded security information may be information needed to verify the validity of the data transmission. Therefore, it can be verified that the wireless communication device 100 has been coupled to the data transmission device 200. Accordingly, it can be verified that the wireless communication device 100 has visited an area adjacent to the data transmission device 200. In addition, the validity of the optional information transmitted from the data transmission device 200 can be verified based on the security information. That is, the validity of all information transmitted from the data transmission device 200 to the wireless communication device 100 can be verified based on the security information.

When a preset event occurs, the data transmission device 200 may transmit the ID information, the optional information and the security information to the wireless communication device 100. The preset event may occur within an area adjacent to the data transmission device 200. The preset event may be, but is not limited to, a physical contact between the wireless communication device 100 and the data transmission device 200.

The data transmission device 200 may be brought into physical contact with the wireless communication device 100. The term "physical contact" does not necessarily mean touching an object. That is, even when a surface of the wireless communication device 100 does not touch a surface of an object, it can be defined that a physical contact has occurred if there is an interaction between the wireless communication device 100 and the object. Therefore, a contactless sensing operation such as barcode recognition or QR code recognition is also defined as a physical contact. That is, an electrical or optical interaction between two objects separated by a certain distance is also defined as a physical contact.

Alternatively, for example, when the data transmission device 200 generates an ultrasonic signal or a sound wave signal, if the wireless communication device 100 senses the ultrasonic signal or the sound wave signal, it can be said that the physical contact has occurred. However, the inventive concept is not limited to this case, and the physical contact may also occur when the data transmission device 200 senses an ultrasonic signal or a sound wave signal of the wireless communication device 100.

The data transmission device 200 may transmit the ID information, the optional information and the security information to the wireless communication device 100 by touching identification patterns on the touchscreen of the wireless communication device 100. However, the inventive concept is not limited to this case, and the data transmission device 200 can also transmit the ID information, the optional information and the security information using other methods such as short-range wireless communication. If the data transmission device 200 transmits the above information to the wireless communication device 100 only by touching the identification patterns on the touchscreen of the wireless communication device 100, the area adjacent to the data transmission device 200 may be limited to an area close enough for the data transmission device 200 and the wireless communication device 100 to touch each other.

The identification patterns may include first through third identification patterns related to the ID information, the optional information and the security information, respectively.

The first through third identification patterns may be touched successively on the touchscreen of the wireless communication device 100, but the inventive concept is not limited to this case. The sequence in which the first through third identification patterns are touched is not limited to a particular sequence. However, the first identification pattern may be touched first. This is because the second and third identification patterns are related to the optional information and the security information which can be used after the data transmission device 200 is identified.

The ID information can be transmitted in a way other than touching the first identification pattern. For example, the ID information may be transmitted using a position sensor of the wireless communication device 100. The position sensor may sense position using at least one of, but not limited to, GPS, wi-fi positioning, magnetic field scan, and short-range wireless communication. The magnetic field scan is a method of sensing position using a magnetic field of a metal beam within a building. That is, the position of the data transmission device 200 may be identified by the position sensor, and the ID information of the data transmission device 200 which can be identified by the position may be transmitted. However, the inventive concept is not limited to this case, and both the method of touching the first identification pattern and another method can be used. In this case, the approximate position of the data transmission device 200 may be identified using the another method, and the accurate position of the data transmission device 200 may be identified using the first identification pattern. This can increase the reliability of the ID information.

The server 300 may communicate with the wireless communication device 100 using wired or wireless communication. The server 300 may receive the ID information, the optional information and the security information from the wireless communication device 100 and verify the validity of the above information.

Specifically, the server 300 may receive the encoded security information and decode the encoded security information. Through this process, the server 300 can verify the validity of the above information. However, the inventive concept is not limited to this case.

The data transmission system according to the embodiment of the inventive concept can also be composed only of the data transmission device 200 and the wireless communication device 100 without the server 300. In this case, validity verification may be performed within the wireless communication device 100. The validity verification may be performed by an application or program within the wireless communication device 100.

Identification patterns in a data transmission method according to an embodiment of the inventive concept will now be described with reference to FIGS. 2 through 8.

FIGS. 2 and 3 illustrate touch region forming points in a wireless communication device in a data transmission method according to an embodiment of the inventive concept. FIGS. 4 through 6 illustrate operations in a method of forming an identification pattern in the wireless communication device in the data transmission method according to the embodiment of the inventive concept. FIG. 7 illustrates the configuration of an identification pattern in the wireless communication device in the data transmission method according to the embodiment of the inventive concept. FIG. 8 illustrates a table showing a security field of the identification pattern in the wireless communication device in the data transmission method according to the embodiment of the inventive concept.

Referring to FIG. 2, if the data transmission method according to the embodiment of the inventive concept uses the identification patterns, a touch region needs to be formed in a touchscreen 110. A touch region (120*a*, 120*b*, 120*c*, 120*d* or 120*e*) may be a region in which points to be touched are defined. That is, in the case of general touches, it is difficult for touches of even the same intention to be made always at the same location on the touchscreen 110. Therefore, the touch region (120*a*, 120*b*, 120*c*, 120*d* or 120*e*) may be preset, and identification patterns may be distinguished from each other based on relative positions of touches within the touch region (120*a*, 120*b*, 120*c*, 120*d* or 120*e*).

Three touches illustrated in the drawing denote a plurality of touch regions 120*a* through 120*e*. That is, even if touch regions are formed at different locations within a phone, they should be recognized as the same touch pattern. Touches pattern that cause rotation as well as touches made at different locations should be recognized as the same touch pattern. That is, while the touch regions 120*d* and 120*e* are rotated versions of the touch region 120*a* by specific angles, they should be recognized as the same touch region. There may be a number of ways to form such touch regions 120*a* through 120*e*.

Referring to FIG. 3, there may be a number of ways to form a quadrilateral touch region 130 through three sequential or simultaneous touches.

A region forming point (1, 2 or 3) may be touched on the touchscreen 110. Specifically, the region forming point (1, 2 or 3) may be touched on a touch point of the touchscreen 110. One region forming point 1, 2 or 3 or a plurality of region forming points 1 through 3 can be provided. The number of the region forming points 1 through 3 is not limited to a particular number as long as the region forming point (or points) 1, 2 or/and 3 can define the quadrilateral touch region 130.

If a plurality of region forming points 1 through 3 are provided, they may be touched sequentially. The region forming points 1 through 3 can be touched in various sequences. For example, a second region forming point 2 may be preset as an upper left vertex as illustrated in the drawing. Therefore, the region forming points 1 through 3 may be touched sequentially according to the preset condition to form the quadrilateral touch region 130. The region forming points 1 through 3 may be touched sequentially. The region forming points 1 through 3 may be touched sequentially at time intervals of more than a predetermined range. The time intervals at which the region forming points 1 through 3 are touched may be tiny time intervals. The region forming points 1 through 3 may be touched by the data transmission device 200. The data transmission device apparatus 500 may sequentially touch the region forming points 1 through 3 by automatically transmitting an electrical signal or a physical signal to the touchscreen.

The predetermined range may be greater than a maximum time during which the touchscreen 110 is recognized as being touched simultaneously. This is because the region forming points 1 through 3 should be recognized as being touched sequentially.

If the region forming points 1 through 3 are touched sequentially instead of being multi-touched, the method of forming an identification pattern according to the embodiment of the inventive concept can be applied not only to capacitive touchscreens in which multi-touch can be implemented relatively easily but also to other types of touchscreens.

Even in the case of capacitive touchscreens, while up to about five multi-touches can be implemented on a background screen or a screen that runs an application, only two or less touches may be recognized when, for example, a web browser is executed. That is, there may be software limitations on multi-touch. On the other hand, since the method of forming an identification pattern for a touchscreen according to the embodiment of the inventive concept uses sequential touch, it is free from software limitations.

However, the region forming points 1 through 3 can also be touched simultaneously instead of sequentially. In the case of the multi-touch enabled touchscreen 100, the region forming points 1 through 3 can be touched simultaneously. In this case, the number of the region forming points 1 through 3 may be adjusted in advance according to the number of multi-touches allowed.

The quadrilateral touch region 130 may be defined by the region forming points 1 through 3. The quadrilateral touch region 130 may also be defined by the region forming points 1 through 3 and a preset condition. The quadrilateral touch region 130 may be shaped like a plane figure on the touchscreen 110. For example, the quadrilateral touch region 130 may be shaped like a rectangle as illustrated in the drawing.

Even when the quadrilateral touch region 130 is shaped like a rectangle, the preset condition may be various. As illustrated in the drawing, a first region forming point 1 may be a point on an upper side of the rectangle, and the second region forming point 2 may be an upper left vertex of the rectangle. A third region forming point 3 may be a point on a left side of the rectangle. A length a of the upper side and a length b of the left side may be preset.

The condition for forming the quadrilateral touch region 130 is not limited to the above example. For example, three of the vertices of the rectangle can be designated as the region forming points 1 through 3. In this case, however, the quadrilateral touch region 130 may be smaller than when the lengths a and b of the sides are preset. That is, in a method of forming the quadrilateral touch region 130 by touching the vertices, the lengths of the sides of the rectangle are determined according to a distance between the region forming points 1 through 3. On the other hand, in a method of forming the quadrilateral touch region 130 by presetting the lengths a and b of the sides, the quadrilateral touch region 130 can be defined as a rectangle with longer sides than the distance between the region forming points 1 through 3. Here, the area of the quadrilateral touch region 130 is defined only within the touchscreen 110.

According to the method of forming the quadrilateral touch region 130 by selecting the lengths a and b of the sides, the same quadrilateral touch region 130 can be formed by touching any one touch point on the upper and left sides. In this case, the same quadrilateral touch region 130 can be set. Even in this case, however, since the region forming points 1 through 3 may have been touched differently, they may be recognized as different identification patterns. That is, the region forming points 1 through 3 as well as identification pattern points 4 through 6 may be used to form a final identification pattern.

The shape of the quadrilateral touch region 130 is not limited to a quadrilateral shape. For example, the quadrilateral touch region 130 may be shaped like a convex n-gon, where n is a natural number of 3 or more. In this case, the number of the region forming points 1 through 3 may vary according to n. That is, the number and sequence of the region forming points 1 through 3 are not limited to a particular number and sequence as long as the touch region can be defined using the preset condition and the region forming points 1 through 3.

The quadrilateral touch region 200 may also be shaped like a circle instead of a quadrilateral. In this case, the region forming points 1 through 3 may be three or more different points on the circumference of the circle. Alternatively, the quadrilateral touch region 130 may be a circle with a preset radius around any one of the region forming points 1 through 3.

As described in the various examples above, the shape of the touch region can be freely defined according to the size and shape of the touchscreen 110 and the positions of the region forming points 1 through 3.

Referring to FIG. 4, an identification pattern point (4, 5 or 6) may exist within the quadrilateral touch region 130. The identification pattern point (4, 5 or 6) may be part of touch points within the quadrilateral touch region 130. However, the inventive concept is not limited to this case. That is, the identification pattern point (4, 5 or 6) may also be part of touch points outside the quadrilateral touch region 130. In this case, a new touch region whose position can be identified based on the quadrilateral touch region 130 may be formed, and the identification pattern point (4, 5 or 6) may be assumed to be located within the new touch region.

One identification pattern point 4, 5 or 6 or a plurality of identification pattern points 4 through 6 may be provided. That is, the number of the identification pattern points 4 through 6 may be adjusted in view of the number of desired identification patterns and limitations of the data transmission device 200. The identification pattern points 4 through 6 may be combined with the region forming points 1 through 3 to form an identification pattern.

Due to the region forming points 1 through 3, a touch region has a plurality of touch points. To prevent an error, however, touch points located on sides of the square on which the region forming points 1 through 3 are located may be excluded. However, the inventive concept is not limited to this case, and touch points touched previously can also be allowed to be touched again.

Even without the excluded touch points, various identification patterns can be completed. Furthermore, since the region forming points 1 through 3 are used for pattern identification, more numbers of identification patterns can be formed in the same touch region. That is, even when the first and third region forming points 1 and 3 touch different points on the upper and left sides of the quadrilateral touch region 130, the same touch region 130 may be formed, but identification patterns formed may be different from each other. Therefore, the number of cases where the first region forming point 1 selects any one of touch points excluding the second region forming point 2 on the upper side may be multiplied by the number of cases where the third region forming point 3 selects any one of nine touch points excluding the second region forming point 2 on the left side. Referring to FIG. 5, the second identification pattern point 5 and the third identification pattern point 6 may be touched after the first identification pattern point 4 is touched.

Referring to FIGS. 6 through 8, each touch point may be represented by coordinates. The coordinates illustrated in FIG. 6 are merely an example, and the inventive concept is not limited to this example. That is, the first through third identification pattern points 4 through 6 may be touched within the quadrilateral region 130 formed by the first through third region forming points 1 through 3.

Referring to FIG. 7, an identification pattern formed by combining region forming points and identification pattern points together may be divided into three fields. As illustrated in the drawing, the identification pattern may be divided into an ID field, an optional field, and a security field. However, this is merely an example, and the inventive concept is not limited to this example.

The ID field may denote a first identification pattern related to the ID information of the data transmission device 200, and the optional field may denote a second identification pattern related to the optional information. The security field may denote a third identification pattern related to the security information. Here, the position of the security field and the position of the optional field within the identification pattern can be reversed. The optional field can be omitted depending on the presence or absence of the optional information.

Referring to FIG. 8, the third identification pattern of the security field may be coded based on time information. For example, the coding may be performed using a one-time password (OTP). In this case, far stronger security can be achieved against illegal use of other's ID. That is, the data transmission device 200 may transmit OTP-coded security information to the wireless communication device 100. In this case, the security information may be decoded by a program or application installed in the wireless communication device 100. Alternatively, the wireless communication device 100 may transmit the OTP-coded security information to the server 300. In this case, the server 300 may decode the security information and transmit the result of verifying to the wireless communication device 100.

As illustrated in FIG. 8, the OTP code may generated as predetermined way according to time. That is, the OTP code may have time, ID or function as a seed, and the server 300 or the wireless communication device 100 may decode the OTP code into an ID using the seed.

Therefore, even if an ID is revealed, since a conversion method of the OTP code is not disclosed, it can be effectively verified that the visit of the wireless communication device 100 to the area adjacent to the data transmission device 200 was due to illegal use of the ID.

A data transmission device performing a data transmission method according to an embodiment will now be described with reference to FIGS. 5, 9 and 10.

FIG. 9 is a perspective view of a data transmission device of a data transmission method according to an embodiment of the inventive concept. FIG. 10 is a side view illustrating a physical contact between the data transmission device and a wireless communication device in the data transmission method according to the embodiment of the inventive concept.

Referring to FIGS. 5 and 9, a data transmission device 200 includes a handle 220, a button unit 230, a protective unit 230, a touchscreen touching unit (240a, 240b or 240c), and an electronic device connector 250.

The handle 210 is not particularly limited but may be shaped like a pole that can be held with a hand. For example, the handle 210 may be shaped like, but not limited to, a cylinder. The handle 210 may enable a user to hold the data transmission device 200 with a hand and press the button unit 220.

The handle 210 may be made of, for example, a conductive material. Therefore, when the handle 210 is held with a hand, static electricity from the hand may be transmitted as an electrical signal. The electrical signal may flow along the button unit 220 and the touchscreen touching unit (240a, 240b or 240c). If a touchscreen 110 touched is a capacitive touchscreen, the electrical signal may be transmitted to the touchscreen 110. If the touchscreen 110 is a resistive touchscreen, the data transmission device 200 may transmit a physical signal instead of the electrical signal to the touchscreen 110. In this case, the handle 210 does not need to be made of a conductive material. However, the inventive concept is not limited to this case.

In addition, even if the touchscreen 110 touched by the data transmission device 200 is a capacitive touchscreen, the handle 210 may not be made of a conductive material. When the handle 210 is not made of a conductive material, the touchscreen touching unit (240a, 240b or 240c) may generate an electrical signal in other ways. Specifically, the electrical signal may be generated using an electric current of an internal battery of the data transmission device 200 or an electric current of an electronic device connected to the data transmission device 200. In this case, a user may hold the data transmission device 200 with a gloved hand, not a bare hand.

When the data transmission device 200 touches a resistive touchscreen, it may transmit a physical signal generated by pressure instead of an electrical signal. In this case, the use of the above electric current is not necessary.

The electronic device connector 250 may connect the data transmission device 200 to an electronic device. The electronic device connector 250 may be a wired end which connects the data transmission device 200 to an electronic device. Alternatively, the electronic device connector 250 may be in the form of a separate part to be wirelessly connected using short-range wireless communication.

When the electronic device connector 250 is in a wired form, the handle 210, even if not made of a conductive material, can receive an external electric current through the electronic device connector 250. That is, an electrical signal to be transmitted to the capacitive touchscreen 110 can be generated using an electric current supplied through the electronic device connector 250. On other hand, when the electronic device connector 250 is in a wireless form, the electrical signal can be generated using an electric current generated by the battery within the data transmission device 200.

The button unit 220 may be pressed by pressure. The pressed button unit 220 can return to its original state due to the force of restitution. The button unit 220 may be formed integrally with the handle 210 and the touchscreen touching unit (240a, 240b or 240c) as illustrated in the drawings, but the inventive concept is not limited to this case. When the button unit 220 is pressed, the data transmission device 200 may transmit certain data to a server or may be powered off. Since the button unit 220 is not an essential element, it can be omitted.

The touchscreen touching unit (240a, 240b or 240c) may transmit an electrical signal to the touchscreen 110 through a physical contact. The term "physical contact" does not necessarily mean touching an object. That is, even when a surface of the touchscreen 110 does not touch a surface of an object, it can be defined that a physical contact has occurred if there is an interaction between the touchscreen 110 and the object. Therefore, a contactless sensing operation such as barcode recognition or QR code recognition is also defined as a physical contact. That is, an electrical and optical interaction between two objects separated by a certain distance is also defined as a physical contact.

If the handle 210 is made of a conductive material, the touchscreen touching unit (240a, 240b or 240c) may transmit to the touchscreen 110 an electric signal generated using an electric current flowing from a hand or an electric current flowing through the electronic device connector 250.

Alternatively, the touchscreen touching unit (240a, 240b or 240c) may protrude in the form of a switch. In this case, when pressed through a physical contact, the touchscreen touching unit (240a, 240b or 240c) may transmit an electrical or physical signal of the data transmission device 200 or an electronic device connected to the data transmission device 200 to the touchscreen 110. In this way, the touchscreen touching unit (240a, 240b or 240c) can transmit a signal to the touchscreen 110 regardless of whether the touchscreen 110 is capacitive or resistive.

The touchscreen touching unit (240a, 240b or 240c) may be provided in a plurality. Three touchscreen touching units 240a through 240c are illustrated in the drawing, but the number of the touchscreen touching units 240a through 240c may be adjusted according to the number of region forming points 1 through 3 and the number of identification pattern points 4 through 6. That is, the number of the touchscreen touching units 240a through 240c is not particularly limited.

The touchscreen touching units 240a through 240c may first touch the region forming points 1 through 3 and then the identification pattern points 4 through 6. The touchscreen touching units 240a through 240c which touch the region forming points 1 through 3 and the identification pattern points 4 through 6 may sequentially transmit electrical and physical signals.

Various identification patterns may be formed on the touchscreen 110 by the touchscreen touching units 240a through 240c. Specifically, the region forming points 1 through 3 may touched first to define a touch region, and then the identification pattern points 4 through 6 may be touched. These touches may be performed by automatically and sequentially transmitting electrical signals or physical signals. The above touches may be sequentially performed at time intervals of more than a predetermined range.

As illustrated in the drawing, a plurality of touchscreen touching units 240a through 240c may be provided. While three touchscreen touching units 240a through 240c are illustrated in the drawing, this is merely an example, and the number of the touchscreen touching units 240a through 240c is not limited to a particular number. The arrangement of the touchscreen touching units 240a through 240c may be preset. The arrangement of the touchscreen touching units 240a through 240c may be determined according to the shape of the region forming points 1 through 3 and the identification pattern point 4 through 6.

The region forming points 1 through 3 are points for forming the quadrilateral touch region 130. However, the touchscreen touching units 240a through 240c for the region forming points 1 through 3 may be arranged in a narrower range than the quadrilateral touch region 130. Specifically, the touchscreen touching units 240a through 240c may define a wider quadrilateral touch region 130 than the arrangement of the touchscreen touching units 240a through 240c for the region forming points 1 through 3 by adjusting the region forming points 1 through 3 and constraints (such as lengths of sides and a length of a radius) of a preset figure.

The protective unit 230 may cover the touchscreen touching units 240a through 240c to protect the touchscreen touching units 240a through 240c. The protective unit 230 may be made of an insulator in order to prevent an unintended electric current from flowing to the touchscreen touching units 240a through 240c.

Referring to FIG. 10, the apparatus for forming an identification pattern for a touchscreen may form an identification pattern through a physical contact with the touchscreen 110. The term "physical contact" does not necessarily mean touching an object. That is, even when a surface of the touchscreen 110 does not touch a surface of an object, it can be defined that a physical contact has occurred if there is an interaction between the touchscreen 110 and the object. Therefore, a contactless sensing operation such as barcode recognition or QR code recognition is also defined as a physical contact. That is, an electrical and optical interaction between two objects separated by a certain distance is also defined as a physical contact. The touchscreen 110 may be embedded in the wireless communication device 100.

A data transmission method according to an embodiment of the inventive concept will now be described with reference to FIGS. 1 and 11. A redundant description of elements and features described above will be given briefly or omitted.

FIG. 11 is a flowchart illustrating a data transmission method according to an embodiment of the inventive concept.

Referring to FIGS. 1 and 11, a wireless communication device receives ID information of a data transmission device (operation S100).

The ID information of the data transmission device 200 is information used to identify which of a plurality of data transmission devices 200 has performed information transmission with the wireless communication device 100. Therefore, it can be identified that the wireless communication device 100 has visited an area adjacent to the data transmission device 200.

Next, the wireless communication device receives encoded security information (operation S200).

The security information may be, but is not limited to, OTP-coded information having time, ID information, etc. as a seed. The security information may be used to verify the validity of information transmitted from the data transmission device 200.

The data transmission device 200 may transmit optional information in addition to the security information. The optional information may include at least one of the number of visits, order contents, order amount, the type of a visit verification shape, and the number of visit verification shapes.

When the optional information is transmitted, the validity of the optional information can also be verified.

Next, the wireless communication device transmits the encoded security information to a server (operation S300).

The server 300 may decode the security information transmitted from the wireless communication device 100. The server 300 may verify the validity of the ID information, the optional information and the security information using a decoding method corresponding to an encoding method.

Next, the wireless communication device receives a verification result from the server (operation S400).

The server 300 verifies validity by decoding the security information and transmits the verification result to the wireless communication device 100. Accordingly, it can be identified that the data transmission method performed by the wireless communication device 100 and the data transmission device 200 is valid.

Unlike operations indicated by solid lines in FIG. 11, operations S300 and S400 indicated by dotted lines can be omitted. That is, verification can also be performed within the wireless communication device 100 instead of the server 300. In this case, verification may be performed by a program or application installed in the wireless communication device. That is, the data transmission method according to the embodiment can be performed not only in an online environment but also in an offline environment.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

The invention claimed is:

1. A data transmission method comprising:
 (a) receiving ID information of a data transmission device from the data transmission device by using a wireless communication device,
  wherein the wireless communication device comprises a touchscreen;
 (b) receiving encoded security information from the data transmission device by using the wireless communication device,
  wherein receiving encoded security information from the data transmission device includes receiving a first identification pattern related to the security information when the data transmission device touches first identification pattern points on the touchscreen; and
 (c) verifying validity of the ID information by decoding the encoded security information using the wireless communication device, wherein the encoding and decoding of the security information are performed using one-time password (OTP) code.

2. The method of claim 1, and the operation (a) comprises receiving a second identification pattern related to the ID information when the data transmission device touches second identification pattern points on the touchscreen of the wireless communication device, wherein the ID information is encoded into the second identification pattern by the second identification pattern points.

3. The method of claim 2, wherein the second identification pattern points comprises a region forming point for defining a touch region.

4. The method of claim 2, wherein the second identification pattern points is provided in a plurality, wherein the second identification pattern points are touched sequentially or simultaneously.

5. The method of claim 2, further comprising receiving optional information from the data transmission device by using the wireless communication device, wherein the optional information comprises at least one of the number of visits, order contents, order amount, the type of a visit verification shape, and the number of visit verification shapes.

6. The method of claim 5, wherein at least one of the ID information, the optical information and the security information is transmitted from the data transmission device using short-range wireless communication.

7. The method of claim 5,
 the operation (d) comprises receiving a third identification pattern related to each of the ID information, the optional information and the security information when the data transmission device touches third identification pattern points on the touchscreen.

8. The method of claim 7, wherein the first through third identification patterns are transmitted at a time when the first through third identification pattern points are touched successively.

9. The method of claim 1, wherein the wireless communication device comprises a position sensor, and the operation (a) comprises obtaining position information using the position sensor and identifying the data transmission device using the position information and the ID information.

10. The method of claim 1, wherein the operation (c) comprises:
 transmitting the encoded security information to a server by using the wireless communication device; and
 verifying validity of the ID information by decoding the security information using the server.

11. The method of claim 2, wherein the first identification points include at least three points that are not contiguous with each other.

12. The method of claim 11, wherein the second identification points include at least three points that are not contiguous with each other.

* * * * *